(12) United States Patent
Kim et al.

(10) Patent No.: US 9,191,175 B2
(45) Date of Patent: Nov. 17, 2015

(54) METHOD AND APPARATUS FOR SUPPORTING HARQ OPERATION USING HARQ CHANNEL IDENTIFIER IN WIRELESS ACCESS SYSTEM

(75) Inventors: Jeongki Kim, Anyang-si (KR); Jinsam Kwak, Anyang-si (KR); Youngsoo Yuk, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 171 days.

(21) Appl. No.: 14/233,134

(22) PCT Filed: Jul. 13, 2012

(86) PCT No.: PCT/KR2012/005604
§ 371 (c)(1),
(2), (4) Date: Jan. 15, 2014

(87) PCT Pub. No.: WO2013/012215
PCT Pub. Date: Jan. 24, 2013

(65) Prior Publication Data
US 2014/0177502 A1    Jun. 26, 2014

Related U.S. Application Data

(60) Provisional application No. 61/508,083, filed on Jul. 15, 2011, provisional application No. 61/509,080, filed on Jul. 18, 2011.

(30) Foreign Application Priority Data

Mar. 30, 2012 (KR) .................. 10-2012-0033335

(51) Int. Cl.
*H04L 5/00* (2006.01)
*H04W 4/00* (2009.01)
*H04W 52/02* (2009.01)

(52) U.S. Cl.
CPC ............ *H04L 5/0055* (2013.01); *H04L 5/0053* (2013.01); *H04W 4/005* (2013.01); *H04W 52/0238* (2013.01)

(58) Field of Classification Search
CPC ... H04L 5/0055; H04L 5/0053; H04W 4/005; H04W 52/0238
See application file for complete search history.

(56) References Cited

U.S. PATENT DOCUMENTS

2011/0041027 A1* 2/2011 Fong et al. .................. 714/749
2011/0211447 A1* 9/2011 Wang et al. ................. 370/230

(Continued)

OTHER PUBLICATIONS

Yan-Xiu, "Wrong Dependency between Extended HARQ IE and sub-DL-UL-MAP for first Zone", IEEE 802.16 Broadband Wireless Access Working Group, IEEE 802.16maint-11/0013, May 2011, 2 pages.

(Continued)

*Primary Examiner* — Albert T Chou
(74) *Attorney, Agent, or Firm* — Lee, Hong, Degerman, Kang & Waimey

(57) ABSTRACT

As an embodiment of the present invention, a method for supporting a HARQ operation of M2M devices using a HARQ Channel Identifier (ACID) in a wireless access system includes transmitting, at a base station, a second UL A-MAP IE to M2M devices sharing a station identifier (STID) in a subframe in which a second M2M device is to retransmit a UL burst, wherein the second UL A-MAP IE includes resource allocation information for allocating a resource region to a first M2M device and includes a second ACID, receiving the UL burst retransmitted using a first ACID from the second M2M device in the subframe, and receiving a new UL burst transmitted using the second ACID from the first M2M device in the subframe, wherein the first and second M2M devices share the STID, and the first and second ACIDs are different from each other.

14 Claims, 5 Drawing Sheets

(56) References Cited

U.S. PATENT DOCUMENTS

| | | | |
|---|---|---|---|
| 2013/0058317 A1* | 3/2013 | Park et al. | 370/336 |
| 2013/0114494 A1* | 5/2013 | Yuk et al. | 370/312 |
| 2013/0301515 A1* | 11/2013 | Kim et al. | 370/312 |
| 2013/0315074 A1* | 11/2013 | Kim et al. | 370/242 |
| 2014/0044205 A1* | 2/2014 | Kim et al. | 375/260 |

OTHER PUBLICATIONS

Park, et al., "Text changes related to A-MAP relevance and HARQ timing (IEEE Std 802.16m)", IEEE 802.16 Broadband Wireless Access Working Group, IEEE C802.16maint-11/0004, May 2011, 7 pages.

Kang, et al., "Considerations on resource allocation for M2M group", IEEE 802.16 Broadband Wireless Access Working Group, IEEE C802.16p-10/0024, Dec. 2010, 5 pages.

Tao, et al., "[DEV] Proposed Text for Shared-STID Addressing Scheme", IEEE 802.16 Broadband Wireless Access Working Group, IEEE C802.16p-rg-11/0016r1, Feb. 2011, 2 pages.

PCT International Application No. PCT/KR2012/005604, Written Opinion of the International Searching Authority dated Dec. 26, 2012, 9 pages.

Draft Amendment to IEEE Standard, "WirelessMAN—Advanced Air Interface for Broadband Wireless Access Systems," LAN/MAN Standards Committee of the IEEE Computer Society, and the IEEE Microwave Theory and Techniques Society, IEEE P802.16p-11/0033 Aug. 2011, 64 pages.

Enhancements to Support Machine-to-Machine Applications, "WirelessMAN—Advanced Air Interface for Broadband Wireless Access Systems," IEEE 802.16p-11/0022, Aug. 2011, 48 pages.

Enhancements to Support Machine-to-Machine Applications, IEEE 802.16p-10/0018r3delta, Jul. 2011, 81 pages.

* cited by examiner

METHOD AND APPARATUS FOR SUPPORTING HARQ OPERATION USING HARQ CHANNEL IDENTIFIER IN WIRELESS ACCESS SYSTEM

CROSS-REFERENCE TO RELATED APPLICATIONS

This application is the National Stage filing under 35 U.S.C. 371 of International Application No. PCT/KR2012/005604, filed on Jul. 13, 2012, which claims the benefit of earlier filing date and right of priority to Korean Application No. 10-2012-0033335, filed on Mar. 30, 2012, and also claims the benefit of U.S. Provisional Application Ser. Nos. 61/508,083, filed on Jul. 15, 2011, and 61/509,080, filed on Jul. 18, 2011, the contents of which are all hereby incorporated by reference herein in their entirety.

TECHNICAL FIELD

The present invention relates to a wireless access system, and more particularly, to various methods and apparatuses for supporting a HARQ operation of M2M devices.

BACKGROUND ART

A communication environment between devices will be briefly described hereinbelow. Machine-to-Machine (M2M) communication refers to communication between electronic devices in the literal sense of the word. In a broad sense, M2M communication means wired or wireless communication between electronic devices or communication between devices controlled by people. Recently, M2M communication generally refers to wireless communication between electronic devices, performed without intervening people. In the early 1990s when the concept of M2M communication was first introduced, M2M communication was recognized as the concept of a remote control, telematics, etc. and a derivative market was very limited. However, as M2M communication has rapidly been developed in the past few years, it has grown as a market receiving attention from the whole world. In particular, M2M communication has exerted an important influence on the field of fleet management in a Point Of Sale (POS) system and a security related application market, remote monitoring of machines or facilities, and smart meter for measuring an operating time of mechanical construction equipment and automatically measuring heat or the used amount of electricity. Future M2M communication will be used for various uses in association with existing mobile communication, wireless high-speed Internet, and low-output communication solution such as Wi-Fi and ZigBee and will be extended up to a Business-to-Consumer (B2C) without being confined to a Business-to-Business (B2B) market any longer.

In M2M communication, all machines equipped with a Subscriber Identity Module (SIM) card are able to transmit and receive data so that they can be remotely managed and controlled. For example, M2M communication technology can be used for numerous machines and equipment such as automobiles, trucks, trains, containers, vending machines, gas tanks, etc., and an application range thereof is very extensive.

Conventionally, it was general to individually manage mobile stations so that one-to-one communication was mainly performed between a base station and a mobile station. Assuming that numerous M2M devices communicate with the base station through one-to-one communication, network overload is expected due to signaling generated between each of the M2M devices and the base station. If M2M communication is rapidly spread and extensively used as described above, an overhead problem may occur due to communication between the M2M devices or between the M2M devices and the base station.

Further, since a human does not participate in operations of M2M devices in an M2M system, an abnormal power outage event may occur in M2M devices. Then the power outage event may also occur in most M2M devices at a location to which the corresponding M2M devices belong.

If a power outage event occurs, the M2M devices should report the power outage event to the base station. For example, M2M devices in an idle state will perform a ranging procedure in order to report the outage event and then collision may occur between the M2M devices. Moreover, the M2M devices in a normal state will perform a bandwidth request procedure to report the power outage event and then there is a high possibility of collision between the M2M devices.

If M2M devices collide with each other, a collision resolution procedure is performed to restore a collision state. Accordingly, upon occurrence of an abnormal power outage event, unnecessary power may be consumed in M2M devices and efficiency of system resources may be deteriorated.

DISCLOSURE

Technical Problem

An object of the present invention devised to solve the problem lies in providing an efficient communication method for M2M devices.

Another object of the present invention is providing a method for allocating an uplink resource when a retransmission situation to M2M devices sharing the same station identifier occurs.

A further object of the present invention is providing a Hybrid Automatic Repeat Request (HARD) method without collision between M2M devices sharing the same station identifier.

Still another object of the present invention devised to solve the problem lies in providing apparatuses for supporting the above methods.

It will be appreciated by persons skilled in the art that that the technical objects that can be achieved through the present invention are not limited to what has been particularly described hereinabove and other technical objects of the present invention will be more clearly understood from the following detailed description

Technical Solution

To achieve the objects of the present invention, the present invention provides various methods for supporting a HARQ operation of M2M devices.

As a first embodiment of the present invention, a method for supporting a Hybrid Automatic Repeat Request (HARQ) operation of Machine-to-Machine (M2M) devices using a HARQ Channel Identifier (ACID) in a wireless access system includes transmitting, at a base station (BS), a second uplink (UL) A-MAP Information Element (IE) to M2M devices sharing a Station Identifier (STID) in a subframe in which a second M2M device is to retransmit a UL burst, wherein the second UL A-MAP IE includes resource allocation information for assigning a resource region to a first M2M device and includes a second ACID, receiving the UL burst retransmitted using a first ACID from the second M2M device in the subframe, and receiving a new UL burst transmitted using the second ACID and the second resource allocation information from the first M2M device in the subframe, wherein the first and second M2M devices share the STID, and the first and second ACIDs are different from each other.

The first embodiment may further includes transmitting, at the BS, a first UL A-MAP IE including first resource allocation information and the first ACID to M2M devices which shares the STID, receiving a UL burst from the second M2M device through a region indicated by the first resource assignment information, and if an error occurs in the UL burst, transmitting a Negative Acknowledgement (NACK) message to the second M2M device.

The first and second UL A-MAP IEs may be transmitted using the STID shared by the M2M devices.

As a second embodiment of the present invention, a method for supporting a HARQ operation of M2M devices using an ACID in a wireless access system includes receiving, an M2M device, a UL A-MAP IE from a BS in a subframe in which a UL burst is to be retransmitted, wherein the UL A-MAP IE includes resource allocation information indicating an assigned resource region and includes a second ACID, and if the first. ACID is different from a first ACID of the UL burst to be retransmitted, retransmitting, at the M2M device, the UL burst using the first ACID in the subframe, wherein the M2M device shares an STID with other M2M devices.

The UL A-MAP IE may be transmitted using the STID by M2M devices sharing the STID.

The second embodiment may further includes receiving a UL A-MAP IE indicating a resource region allocated using the first ACID from the BS, transmitting a UL burst through the resource region allocated using the first ACID, and receiving a NACK message indicating that an error occurs in the UL burst.

As a third embodiment of the present invention, a BS for supporting a HARQ operation of M2M devices using an ACID in a wireless access system include a transmitter, a receiver, and a processor for supporting the HARQ operation.

In this case, the BS is configured to transmit a second UL A-MAP IE to M2M devices sharing an STID through the transmitter in a subframe in which a second M2M device is to retransmit a UL burst, wherein the second UL A-MAP IE includes resource allocation information for allocating a resource region to a first M2M device and includes a second ACID, receive the UL burst retransmitted using a first ACID from the second M2M device in the subframe through the receiver, and receive a new UL burst transmitted using the second ACID and the second resource allocation information from the first M2M device in the subframe, wherein the first and second M2M devices share the STID, and the first and second ACIDs are different from each other.

The BS may transmit a first UL A-MAP IE including first resource allocation information and the first ACID to M2M devices sharing the STID, receive a UL burst from the second M2M device through a region indicated by the first resource assignment information, and if an error occurs in the UL burst, transmit a NACK message to the second M2M device.

The first and second UL A-MAP IEs may be transmitted using the STID shared by the M2M devices.

As a fourth embodiment of the present invention, an M2M device for supporting a HARQ operation using an ACID in a wireless access system includes a transmitter, a receiver, and a processor for supporting the HARQ operation.

In this case, the M2M device is configured to receive a UL A-MAP IE from a BS through the receiver in a subframe in which a UL burst is to be retransmitted, wherein the UL A-MAP IE includes resource allocation information indicating an assigned resource region and includes a second ACID, and if the second ACID is different from a first ACID of the UL burst to be retransmitted, retransmit the UL burst using the first ACID in the subframe through the transmitter, wherein the M2M device shares an STID with other M2M devices. The UL A-MAP IE may be transmitted using the STID by M2M devices sharing the STID.

In the fourth embodiment, the M2M device may receive a UL A-MAP IE indicating a resource region assigned using the first ACID from the BS through the receiver, transmit a UL burst through the resource region assigned using the first ACID through the transmitter, and receive a NACK message indicating that an error occurs in the UL burst through the receiver.

As a fifth embodiment of the present invention, a method for supporting a HARQ operation of M2M devices using an ACID in a wireless access system includes allocating, at a BS, a UL resource to a first M2M device which shares an STID, wherein, if a UL burst to be retransmitted from a second M2M device sharing the STID with the first M2M device in a subframe in which the UL resource is assigned, the base station allocates the UL resource using an ACID which is different from an ACID of the UL burst to be retransmitted.

The fifth embodiment may further include transmitting a UL A-MAP IE including resource assignment allocation indicating the assigned UL resource, the ACID which is different from the ACID of the UL burst, and the STID.

The first to fifth embodiments of the present invention are merely some parts of the exemplary embodiments of the present invention and other embodiments into which the technical features of the present invention are incorporated can be derived and understood by those skilled in the art from the detailed description of the present invention which follows.

Advantageous Effects

According to the embodiments of the present invention, the following effects can be obtained.

First, an efficient communication method for M2M devices can be provided.

Second, an uplink resource can be assigned even when a retransmission situation to M2M devices sharing the same station identifier occurs in a TDD environment.

Third, a HARQ method can be provided without collision between M2M devices sharing the same station identifier.

It will be appreciated by persons skilled in the art that that the effects that can be achieved through the present invention are not limited to what has been particularly described hereinabove and other advantages of the present invention will, be more clearly derived and understood from the following detailed description. Namely, effects which are not intended in carrying out the present invention can also be derived from the embodiments of the present invention by those with ordinary skill in the art.

DESCRIPTION OF DRAWINGS

The accompanying drawings, which are included to provide a further understanding of the invention, illustrate embodiments of the invention and together with the description serve to explain the principle of the invention. However, technical features of the present invention are not limited to a specific drawing and features shown in each drawing may configure a new embodiment by combination.

In the drawings.

BEST MODE

Figure 1:
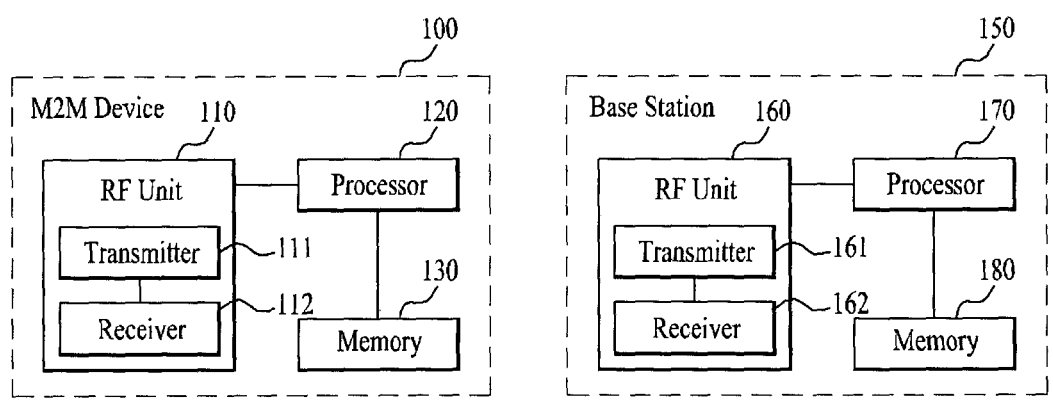
FIG. 1 is a diagram schematically explaining the configuration of an M2M device and a BS according to an exemplary embodiment of the present invention.

The embodiments of the present invention provide methods and apparatuses for supporting a HARQ operation of M2M devices.

The exemplary embodiments described hereinbelow are combinations of elements and features of the present invention in prescribed forms. The elements or features may be considered selective unless otherwise mentioned. Each element or feature may be practiced without being combined with other elements or features. Also, some elements and/or features may be combined with one another to constitute the embodiments of the present invention. Operation orders described in embodiments of the present invention may be rearranged. Some elements or features of one embodiment may be included in another embodiment or may be replaced with corresponding elements or features of another embodiment.

In the description of the drawings, procedures or steps, which may obscure the substance of the present invention, are not explained. In addition, procedures or steps, which can be understood by those skilled in the art, are not explained.

In the exemplary embodiments of the present invention, a description is given of data transmission and reception between a base station and a mobile station. Here, the base station refers to a terminal node of a network communicating directly with the mobile station. In some cases, a specific operation described as being performed by the base station may be performed by an upper node of the base station.

Namely, in a network comprised of a plurality of network nodes including a base station, various operations performed for communication with a mobile station may be performed by the base station, or network nodes other than the base station. The term Base Station (BS) may be replaced with the term fixed station, Node B, eNode B (eNB), Advanced Base Station (ABS), access point, etc.

The term Mobile Station (MS) may be replaced with the term User Equipment (UE), Subscriber Station (SS), Mobile Subscriber Station (MSS), mobile terminal, Advanced Mobile Station (AMS), terminal, etc. Particularly, in the present invention, the mobile station may have the same meaning as an M2M device.

A transmitting end refers to a fixed and/or mobile node which transmits a data service or a voice service and a receiving end refers to a fixed and/or mobile node which receives a data service or a voice service. Therefore, in uplink, an MS may be a transmitting end and a BS may be a receiving end. Similarly, in downlink, the MS may be a receiving end and the BS may be a transmitting end.

The exemplary embodiments of the present invention can be supported by standard documents disclosed in at least one of wireless access systems including an IEEE 802.xx system, a 3GPP system, a 3GPP LTE system, and a 3GPP2 system. That is, obvious steps or portions that are not described in the embodiments of the present invention can be supported by the above documents.

For all terminology used herein, reference can be made to the above standard documents. Especially, the exemplary embodiments of the present invention can be supported by at least one of P802.16-2004, P802.16e-2005, P803.16m, P802.16p, and P802.16.1b which are standard documents of the IEEE 802.16 system.

Reference will now be made in detail to the exemplary embodiments of the present invention in conjunction with the accompanying drawings. The detailed description, which will be given below with reference to the accompanying drawings, is intended to explain exemplary embodiments of the present invention, rather than to show the only embodiments that can be implemented according to the invention.

Hereinafter, the embodiments of the present invention will be described in detail with reference to the accompanying drawings so that the present invention can be easily realized by those skilled in the art. However, the present invention is not limited to the embodiments described herein and can be achieved in various different forms. In the drawings, parts unrelated to the description are omitted to clearly explain the present invention and the same reference numbers will be used throughout this specification to refer to the same or like parts.

In this specification, when any part "includes" a constituent element, this means that any part may further include other constituent elements rather than excluding other constituent elements unless specified otherwise. In addition, the term "... part", "... portion", or "... module" disclosed in this specification refers to a unit for processing at least one function or operation and can be realized by hardware, software, or a combination thereof. In addition, the specific terms used in the embodiments of the present invention are provided to aid in understanding of the present invention and those terms may be changed without departing from the spirit of the present invention.

1. M2M Device General

Hereinafter, M2M communication refers to communication between Mobile Stations (MSs) via a Base Station (BS), between a BS and MSs without human intervention, or between M2M devices. Accordingly, M2M devices refer to MSs which can support the above M2M communication.

An Access Service Network (ASN) for an M2M service is defined as an M2M ASN and a network entity communicating with M2M devices is called an M2M server. The M2M server executes an M2M application and provides an M2M specific service for one or more M2M devices. An M2M feature indicates the feature of an M2M application and one or more features may be necessary to provide the application. An M2M device group refers to a group of M2M devices which share one or more common features.

Devices performing communication according to an M2M scheme (which may be called M2M devices, M2M communication devices, Machine Type Communication (MTC) devices, etc.) will increase in number in a given network as machine application types thereof increase.

The machine application types include (1) security, (2) public safety, (3) tracking and tracing, (4) payment, (5) healthcare, (6) remote maintenance and control, (7) metering, (8) consumer device, (9) fleet management in a POS system and security related application market, (10) M2M communication of a vending machine, (11) remote monitoring of machines or facilities, and smart meter for measuring an operating time of mechanical construction equipment and automatically measuring heat and the used amount of electricity, and (12) surveillance video communication of a surveillance camera. However, the device application types are not limited thereto and a variety of device application types may be applied.

Another feature of M2M devices is that they have low mobility, that is, they seldom move once installed. In other words, the M2M devices are stationary for a considerably long time. An M2M communication system may simplify or optimize mobility related operations for a specific M2M application having a fixed location, such as secured access and surveillance, public safety, payment, remote maintenance and control, and metering.

Thus, as the machine application types increase, the number of M2M communication devices may rapidly increase compared to the number of a general mobile communication devices. Accordingly, if each of the M2M devices individually communicates with a BS, a wireless interface and/or a network may be subject to severe load.

Hereinafter, the exemplary embodiments of the present invention will be described when M2M communication is applied to a wireless communication system (e.g. P802.16e, P802.16m, P802.16.1b, P902.16p, etc.). However, the present invention is not limited thereto and is applicable to other communication systems such as 3GPP LTE/LTE-A systems.

FIG. 1 is a diagram schematically explaining the configuration of an M2M device and a BS according to an exemplary embodiment of the present invention.

Referring to FIG. 1, an M2M device 100 may include a Radio Frequency (RF) unit 110 and a processor 120. A BS 150 may include an RF unit 160 and a processor 170. The M2M device 100 and the BS 150 may selectively include memories 130 and 180, respectively. Although one M2M device and one BS are shown in FIG. 1, an M2M communication environment may be established between a plurality of M2M devices and BSs.

The RF units 110 and 160 may respectively include transmitters 111 and 161, and receivers 112 and 162. The transmitter 111 and the receiver 112 of the M2M device 100 are configured to transmit and receive signals to and from the BS 150 and other M2M devices. The processor 120 is functionally connected to the transmitter 111 and the receiver 112 so that the processor 120 may control the transmitter 111 and the receiver 112 to exchange signals with other devices. The processor 120 may process signals to be transmitted and transmit the processed signals to the transmitter 111. The processor 120 may process signals received by the receiver 112.

If necessary, the processor 120 may store information included in exchanged messages in the memory 130. With such a configuration, the M2M device 100 may perform methods of various embodiments of the present invention which will be described below.

Meanwhile, although not shown in FIG. 1, the M2M device 100 may additionally include a variety of configurations according to an application type thereof. For example, if the M2M device 100 is for intelligent metering, the M2M device 100 may include an additional configuration for power measurement, and an operation for such power measurement may be controlled by the processor 120 shown in FIG. 1 or an additionally configured processor (not shown).

Although, in FIG. 1, the case in which communication between the M2M device 100 and the BS 150 is performed is shown by way of example, an M2M communication method according to the present invention may be performed between one or more M2M devices, and each device may carry out methods according to various embodiments, which will be described below, with the same configuration as that of the device shown in FIG. 1.

The transmitter 161 and the receiver 162 of the BS 150 are configured to transmit and receive signals to and from other BSs, M2M servers, and M2M devices. The processor 170 is functionally connected to the transmitter 161 and the receiver 162 so that the processor 170 may control the transmitter 161 and the receiver 162 to exchange signals with other devices. The processor 170 may process signals to be transmitted and transmit the processed signals to the transmitter 161. The processor 170 may process signals received by the receiver 162. If necessary, the processor 170 may store information included in exchanged messages in the memory 180. With such a configuration, the BS 150 may perform methods of various embodiments of the present invention which will be described below.

The processors 120 and 170 of the M2M device 110 and the BS 150 direct (e.g. control, adjust, manage, etc.) operations of the M2M 110 and the BS 150, respectively. The processors 120 and 170 may be respectively connected to the memories 130 and 180 which store program codes and data. The memories 130 and 180 connected respectively to the processors 120 and 170 store operating systems, applications, and general files.

Each of the processors 120 and 170 of the present invention may be called a controller, a microcontroller, a microcomputer, etc. Meanwhile, each of the processors 120 and 170 may be implemented by hardware, firmware, software, or combinations thereof. When the embodiments of the present invention are implemented using hardware, Application Specific Integrated Circuits (ASICs), Digital Signal Processors (DSPs), Digital Signal Processing Devices (DSPDs), Programmable Logic Devices (PLDs), Field Programmable Gate Arrays (FPGAs), or the like, devised to perform the present invention, may be included in the processors 120 and 170.

Meanwhile, when the embodiments of the present invention are implemented using firmware or software, the firmware or software may be configured to include a module, a procedure, or a function which performs the function or operation of the present invention. The firmware or software configured to be able to perform the present invention may be included in the processors 120 and 170 or may be stored in the memories 130 and 180 so as to be executed by the processors 120 and 170.

2. Hybrid Automatic Repeat reQuest (HARQ)

HARQ is used to transmit and receive unicast data traffic and unicast Medium Access Control (MAC) control messages in both downlink (DL) and uplink (UL). HARQ is based on a stop-and-wait protocol. An Advanced Base Station (ABS) and an Advanced Mobile Station (AMS) may maintain a plurality of HARQ channels. DL HARQ channels are identified by a DL HARQ Channel Identifier (ACID) and UL HARQ channels are identified by a UL ACID.

An assignment A-MAP Information Element (IE), a HARQ subpacket, and a corresponding feedback are transmitted according to predefined timing. In UL, HARQ subpacket retransmission is performed at predefined timing. Each transmission time is indicated by an AAI subframe index and a frame index.

To determine A-MAP relevance and HARQ timing, a DL HARQ feedback offset z, a UL HARQ transmission offset v, and a UL HARQ feedback offset w are set. In DL HARQ transmission, a DL retransmission processing time $T_{DL\_Rx\_Processing}$ of an MS (AMS or M2M device) is considered for the DL HARQ feedback offset z. In UL HARQ transmission, a UL transmission processing time $T_{UL\_Tx\_Processing}$ of the AMS and a UL retransmission processing time $T_{UL\_Rx\_Processing}$ of an ABS are considered for the UL HARQ transmission offset v and the UL HARQ feedback offset w, respectively.

$T_{DL\_Rx\_Processing}$ and $T_{UL\_Tx\_Processing}$ of the AMS are 3 AAI subframes. $T_{UL\_Rx\_Processing}$ of the ABS broadcast through S-SFH SP1 IE is 3 or 4 AAI subframes.

(1) HARQ in Frequency Division Duplex (FDD)

Figure 2:
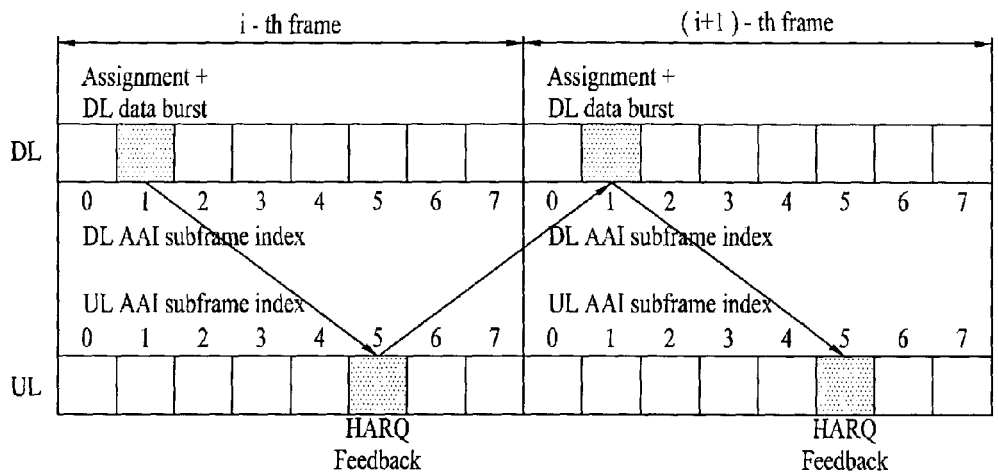
FIG. 2 is a diagram showing an exemplary FDD DL HARQ transmission method.

FIG. 2 is a diagram showing an exemplary FDD DL HARQ transmission method.

DL HARQ subpacket transmission corresponding to a DL assignment A-MAP IE in an l-th DL subframe of an i-th frame is performed in an m-th DL subframe of the i-th frame. A HARQ feedback for the DL HARQ subpacket is transmitted in an n-th UL subframe of a j-th frame. The subframe indexes m and n and the frame index j determined using l and i.

The following Table 1 shows an exemplary frame configuration table for FDD DL HARQ timing.

TABLE 1

| Content | AAI Subframe Index | Frame Index |
|---|---|---|
| DL Assignment A-MAP IE Tx | 1 | i |
| DL HARQ Subpacket Tx | m = 1 | i |
| UL HARQ feedback Tx | n = ceil(m + F/2) mod F | $j = \left(i + \text{floor}\left(\frac{\text{ceil}(m + F/2)}{F}\right) + z\right) \bmod 4$ where $z = \begin{cases} 0, & \text{if } ((\text{ceil}(F/2) - N_{TTI}) \geq T_{DL\_Rx\_Processing}) \\ 1, & \text{else} \end{cases}$ |

In Table 1, F denotes the number of subframes defined by the frame configuration table. l denotes a DL subframe number in which an A-MAP is transmitted, starting from 0 for a first DL subframe and numbering up to F−1. In the case of long TTI transmission, l is permitted within subframes 0 to F−4 (i.e. l∈{0, 1, . . . , F−4}). m denotes a DL subframe number in which HARQ subpacket transmission is started, starting from 0 for a first DL subframe 0 and numbering up to F−1. n denotes a UL subframe number in which a HARQ Acknowledgement (ACK) message is transmitted, starting from 0 for a first subframe 0 and numbering up to F−1. i denotes a frame number in which an A-MAP is transmitted and a HARQ subpacket is started, starting from 0 for a first frame of a superframe and numbering up to 3. j denotes a frame number in which a HARQ ACK message is transmitted, starting from 0 for a first frame of a superframe and numbering up to 3. $N_{TTI}$ denotes the number of AAI subframes that a HARQ subpacket spans (i.e. 1 for a default TTI to 4 for a long TTI in FDD DL). A data burst reception (Rx) processing time required by an M2M device is $T_{DL\_Rx\_Processing}$ and is measured in subframes.

Referring to FIG. 2, the time relationship between a DL assignment A-MAP IE corresponding to HARQ feedback, a DL HARQ subpacket with a default TTI, and retransmission in an FDD frame structure for channel bandwidths of 5, 10, and 20 MHz can be checked.

Figure 3:
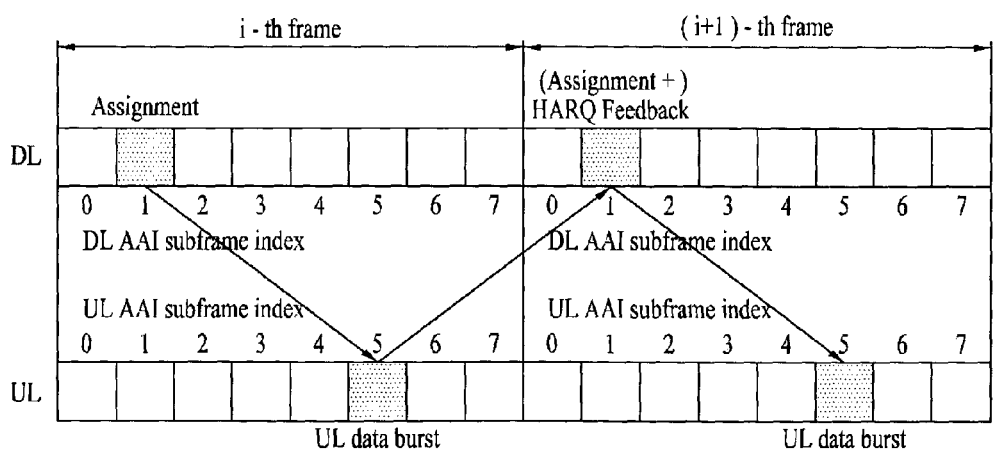
FIG. 3 is a diagram showing an exemplary FDD UL HARQ transmission method.

FIG. 3 is a diagram showing an exemplary FDD UL HARQ transmission method.

UL HARQ subpacket transmission corresponding to an assignment A-MAP IE in an l-th DL subframe of an i-th frame is started in an m-th UL subframe of the j-th frame. A HARQ feedback for the UL HARQ subpacket is transmitted in an l-th subframe of a k-th frame. If DL HARQ feedback indicates a Negative Acknowledgement (NACK), UL HARQ subpacket retransmission is started in an m-th UL AAI subframe of a p-th frame. The AAI subframe index m and the frame indexes j, k, and p are calculated as shown in Table 2 below.

TABLE 2

| Content | AAI Subframe Index | Frame Index |
|---|---|---|
| UL Assignment A-MAP IE Tx | 1 | i |
| UL HARQ Subpacket Tx | n = ceil(1 + F/2) mod F | $j = \left(i + \text{floor}\left(\frac{\text{ceil}(1 + F/2)}{F}\right) + v\right) \bmod 4$ where $v = \begin{cases} 0, & \text{if } ((\text{ceil}(F/2) - 1) \geq T_{UL\_Tx\_Processing}) \\ 1, & \text{else} \end{cases}$ |
| DL HARQ feedback Tx | 1 | $k = \left(j + \text{floor}\left(\frac{(m + F/2)}{F}\right) + w\right) \bmod 4$ where $w = \begin{cases} 0, & \text{if } ((\text{floor}(F/2) - N_{TTI}) \geq T_{UL\_Rx\_Processing}) \\ 1, & \text{else} \end{cases}$ |
| UL HARQ Subpacket ReTx | m | $p = \left(p + \text{floor}\left(\frac{\text{ceil}(1 + F/2)}{F}\right) + v\right) \bmod 4$ where $v = \begin{cases} 0, & \text{if } ((\text{ceil}(F/2) - 1) \geq T_{UL\_Tx\_Processing}) \\ 1, & \text{else} \end{cases}$ |

In Table 2, F denotes the number of subframes defined by the frame configuration table. l denotes a DL subframe number in which an A-MAP or a HARQ ACK message is transmitted, starting from 0 for a first DL subframe and numbering up to F−1. In the case of long TTI transmission, l is permitted within subframes F−4 to 0 (i.e. l∈{F−4, F−3, ..., F−1, 0}). m denotes a UL subframe number in which HARQ subpacket transmission is started, starting from 0 for a first UL subframe 0 and numbering up to F−1. i denotes a frame number in which an A-MAP is transmitted, starting from 0 for a first frame of a superframe and numbering up to 3. j denotes a frame number in which HARQ subpackets are transmitted, starting from 0 for a first frame of a superframe and numbering up to 3. p denotes a frame number in which a HARQ ACK message is transmitted, starting from 0 for a first frame of a superframe and numbering up to 3. k denotes a frame number in which HARQ subpacket transmission is started, starting from 0 for a first frame of a superframe and numbering up to 3. $N_{TTI}$ denotes the number of AAI subframes that a HARQ subpacket spans (i.e. 1 for a default TTI to 4 for a long TTI in FDD UL). $T_{UL\_Tx\_Processing}$ denotes a data burst transmission (Tx) processing time required by an AMS and is measured in subframes. $T_{UL\_Rx\_Processing}$ denotes an Rx processing time required by an ABS and is measured in subframes.

Referring to FIG. 3, the time relationship between a UL assignment A-MAP IE corresponding to HARQ feedback, a UL HARQ subpacket with a default TTI, and retransmission in an FDD frame structure for channel bandwidths of 5, 10, and 20 MHz can be appreciated. In this example, $T_{UL\_Tx\_Processing}$ and $T_{UL\_Rx\_Processing}$ are 3 AAI subframes.

(2) HARQ in Time Division Duplex (TDD)

Figure 4:
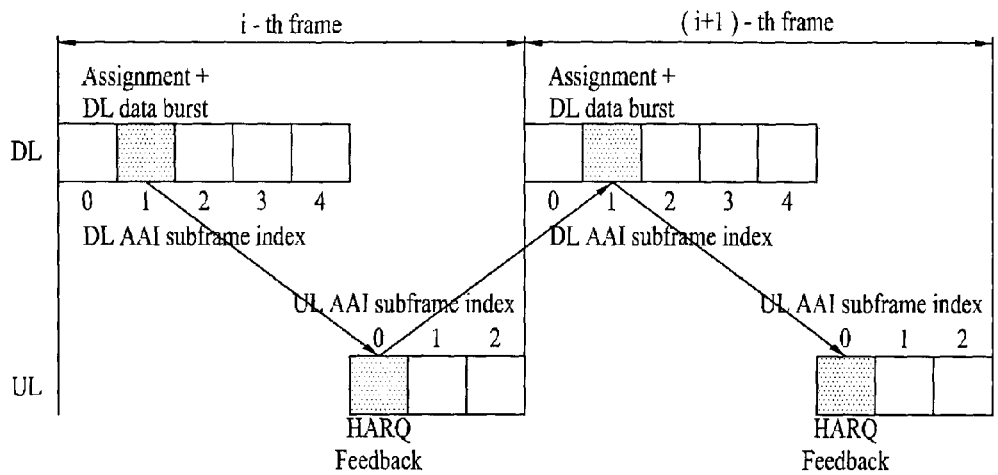
FIG. 4 is a diagram showing an exemplary TDD DL HARQ transmission method.

FIG. 4 is a diagram showing an exemplary TDD DL HARQ transmission method.

DL HARQ subpacket transmission corresponding to a DL assignment A-MAP IE in an l-th subframe of an i-th frame is started in an m-th DL subframe of the i-th frame. A HARQ feedback for the DL HARQ subpacket is transmitted in an n-th UL subframe of a j-th frame. The subframe indexes m and n and the frame index j are determined using l and i shown in Table 3. The following Table 3 shows an exemplary frame configuration table used in a TDD system.

denotes the number of UL subframes. l denotes a DL subframe number in which an A-MAP is transmitted, starting from 0 for a first DL subframe and numbering up to D−1. m denotes a DL subframe number in which HARQ subpacket transmission is started, starting from 0 for a first DL subframe 0 and numbering up to D−1. n denotes a UL subframe number in which a HARQ ACK message is transmitted, starting from 0 for a first subframe 0 and numbering up to U−1. i denotes a frame number in which an A-MAP is transmitted and a HARQ subpacket is started, starting from 0 for a first frame of a superframe and numbering up to 3. j denotes a frame number in which a HARQ ACK message is transmitted, starting from 0 for a first frame of a superframe and numbering up to 3. $N_{TTI}$ denotes the number of AAI subframes that a HARQ subpacket spans (i.e. 1 for a default TTI to 4 for a long TTI in TDD DL). A data burst Rx processing time required by an M2M device is $T_{DL\_Rx\_Processing}$ and is measured in subframes. Ceil(x) denotes a unit function indicating a minimum integer which is greater than or equal to x, and floor (x) denotes a unit function indicating a maximum integer which is less than or equal to x. A DL assignment A-MAP IE transmitted in an l-th (excluding 0) DL subframe of an i-th frame also indicates long TTI transmission. In this case, long TTI transmission of a DL HARQ subpacket is started in a 0-th DL subframe of an (i+1)-th frame. A HARQ feedback for long TTU transmission is transmitted in an n-th UL subframe of a j-th frame. The subframe index n and the frame index j are calculated according to equations shown in Table 3 by replacing the subframe index m and the frame index i by 1 and (i+1), respectively.

Referring to Table. 3, the time relationship between a DL assignment A-MAP IE corresponding to HARQ feedback, a DL HARQ subpacket with a default TTI, and retransmission in a TDD frame structure for channel bandwidths of 5, 10, and 20 MHz can be checked.

Figure 5:
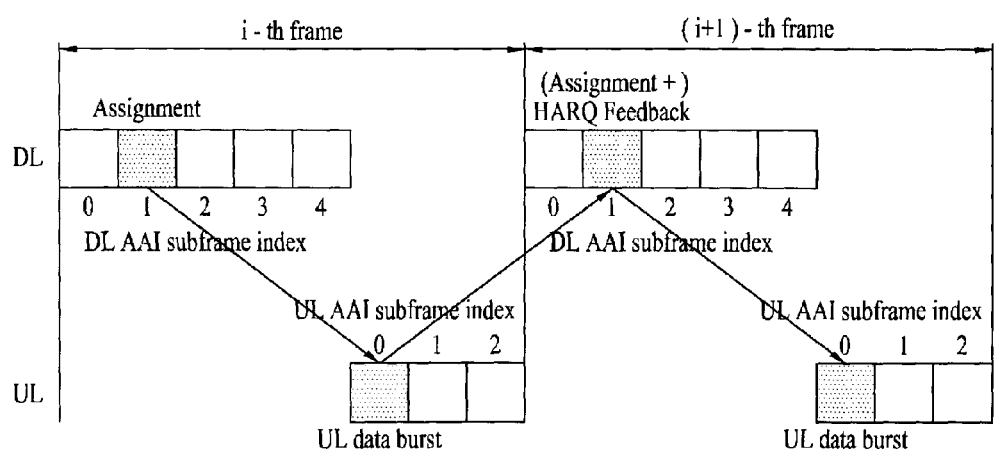
FIG. 5 is a diagram showing an exemplary TDD UL HARQ transmission method.

FIG. 5 is a diagram showing an exemplary TDD UL HARQ transmission method.

UL HARQ subpacket transmission corresponding to an assignment A-MAP IE in an l-th DL subframe of an i-th frame is started in an m-th UL subframe of the j-th frame. A HARQ feedback for the UL HARQ subpacket is transmitted in an l-th

TABLE 3

| Content | AAI Subframe Index | Frame Index |
|---|---|---|
| DL Assignment A-MAP IE Tx | 1 | i |
| DL HARQ Subpacket Tx | m = 1 | i |
| UL HARQ feedback Tx | For D > U<br>$n = \begin{cases} 0, & \text{for } 0 \leq m < K \\ m - K, & \text{for } K \leq m < U + K \\ U - 1, & \text{for } U + K \leq m < D \end{cases}$<br>where<br>K = floor((D − U)/2)<br><br>For D ≤ U<br>n = m − K<br>where<br>K = −ceil((U − D)/2) | J = (i + z)mod 4<br>where<br>$z = \begin{cases} 0, & \text{if } ((D - m - N_{TTI} + n) \geq T_{DL\_Rx\_Processing}) \\ 1, & \text{else} \end{cases}$ |

Referring to Table 3, D denotes the number of DL subframes defined by the frame configuration table and U subframe of a k-th frame. If DL HARQ feedback indicates NACK, UL HARQ subpacket retransmission is started in an m-th UL AAI subframe of a p-th frame. The AAI subframe index m and the frame indexes j, k, and p are calculated as shown in Table 4 below.

3. STID Sharing Method

Figure 6:
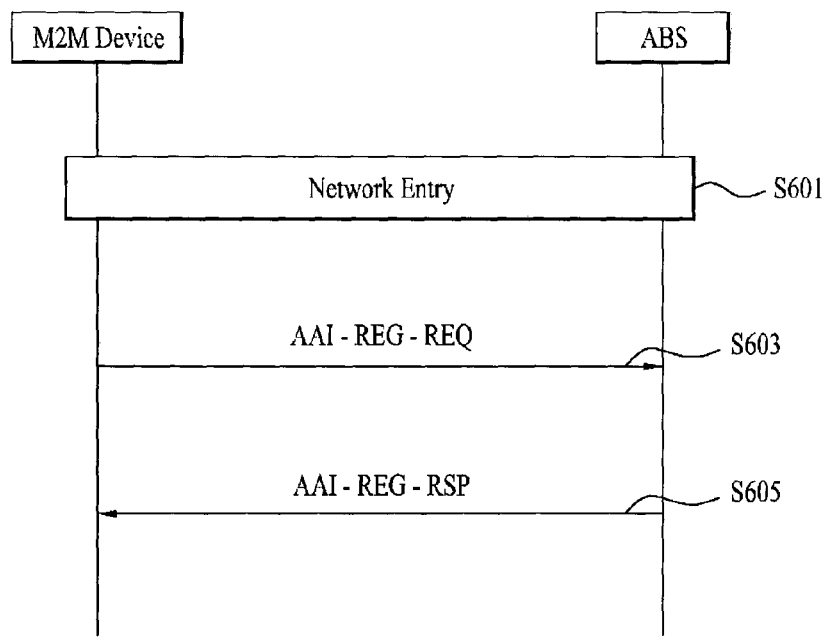
FIG. 6 is a diagram showing an exemplary Station Identifier (STID) sharing method based on TDM.

FIG. 6 is a diagram showing an exemplary Station Identifier (STID) sharing method based on TDM.

TABLE 4

| Content | AAI Subframe Index | Frame Index |
|---|---|---|
| UL Assignment A-MAP IE Tx in DL | 1 | li |
| UL HARQ Subpacket Tx | For default TTI and $D \geq U$<br>$m = \begin{cases} 0, & \text{for } 0 \leq l < K \\ l - K, & \text{for } K \leq l < U + K \\ U - 1, & \text{for } U + K \leq l < D \end{cases}$<br>where<br>$K = \text{floor}((D - U)/2)$<br>For default TTI and $D < U$<br>$m = \begin{cases} (0, \ldots, l - K), & \text{for } l = 0 \\ l - K, & \text{for } 0 < l < D - 1 \\ (l - K, \ldots, U - 1), & \text{for } l = D - 1 \end{cases}$<br>where<br>$K = -\text{ceil}((U - D)/2)$<br>For long TTI<br>$m = 0$ | $j = (i + v) \bmod 4$<br>where<br>$v = \begin{cases} 0, & \text{if } ((D - l - 1 + m) \geq T_{UL\_Tx\_Processing}) \\ 1, & \text{else} \end{cases}$ |
| DL HARQ feedback Tx | 1 | $k = (j + 1 + w) \bmod 4$<br>where<br>$w = \begin{cases} 0, & \text{if } ((U - m - N_{TTI} + 1) \geq T_{UL\_Rx\_Processing}) \\ 1, & \text{else} \end{cases}$ |
| UL HARQ Subpacket ReTx | m | $p = (k + v) \bmod 4$<br>where<br>$v = \begin{cases} 0, & \text{if } ((D - l - 1 + m) \geq T_{UL\_Tx\_Processing}) \\ 1, & \text{else} \end{cases}$ |

In Table 4, D denotes the number of DL subframes defined by the frame configuration table and U denotes the number of UL subframes. l denotes a DL subframe number in which an A-MAP or a HARQ ACK message is transmitted, starting from 0 for a first DL subframe and numbering up to D−1. m denotes a DL subframe number in which HARQ subpacket transmission is started, starting from 0 for a first DL subframe 0 and numbering up to U−1. i denotes a frame number in which an A-MAP is transmitted, starting from 0 for a first frame of a superframe and numbering up to 3. j denotes a frame number in which HARQ subpackets are transmitted, starting from 0 for a first frame of a superframe and numbering up to 3. p denotes a frame number in which a HARQ ACK message is transmitted, starting from 0 for a first frame of a superframe and numbering up to 3. k denotes a frame number in which HARQ subpacket transmission is started, starting from 0 for a first frame of a superframe and numbering up to 3. $N_{TTI}$ denotes the number of AAI subframes that a HARQ subpacket spans (i.e. 1 for a default TTI to 4 for a long TTI in TDD UL). $T_{UL\_Tx\_Processing}$ denotes a data burst Tx processing time required by an M2M device and is measured in subframes. $T_{UL\_Rx\_Processing}$ denotes an Rx processing time required by an ABS and is measured in subframes.

Referring to FIG. 5, the time relationship between a UL assignment A-MAP IE corresponding to HARQ feedback and a UL HARQ subpacket having a default TTI, and retransmission in a TDD frame structure for channel bandwidths of 5, 10, and 20 MHz can be checked. In this example, $T_{UL\_Tx\_Processing}$ and $T_{UL\_Rx\_Processing}$ are 3 AAI subframes.

An STID is used to identify a specific AMS (including an M2M device) in an ABS area. In an M2M system, more M2M devices than those in a conventional system (e.g. human type communication) are present. Accordingly, as opposed to the conventional system, a plurality of M2M devices can share the same STID within the same ABS. Namely, the ABS can allocate the same STID to a plurality of M2M devices.

When a plurality of M2M devices share the same STID, it may be defined that the same STID is used by only one M2M device in units of time (e.g. in a frame unit) as a method which is capable of distinguishing between the M2M devices. For example, when an ABS allocates one STID to 4 M2M devices so as to share the same STID, the ABS may inform the M2M devices of a time (e.g. a frame location or a frame number) indicating when each M2M device can use the STID and of a period for allowing each M2M device to repeatedly use frames. Hereinafter, a method through which two or more M2M devices share one STID will be described with reference to FIG. 6.

Referring to FIG. 6, an M2M device may enter a network to access an ABS (step S601).

For registration in the ABS, the M2M device transmits a registration request (AAI-REG-REQ) message to the ABS. The AAI-REG-REQ message may include an STID sharing support indicator indicating whether to support STID sharing (step S603).

As a response to the AAI-REG-REQ message, the ABS transmits a registration response (AAI-REG-RSP) message to the M2M device. The AAI-REG-RSP message may include the STID sharing support indicator indicating whether to support STID sharing, an STID valid periodicity (STID_Valid_Periodicity) field indicating periodicity of an STID used by the M2M device, and an STID valid offset (STID_Valid_Offset) field indicating a location (i.e. frame) of an STID used by the M2M device (step S605).

If the sharing support indicator included in the AAI-REG-RSP message indicates that STID sharing is supported, the M2M device may calculate frames which can use an STID assigned thereto by a method shown in Equation 1 using the STID_Valid_Periodicity field and the STID_Valid_Offset_ field.

$$\text{Frame}_{num} \bmod \text{STID\_Valid\_Periodicity} = \text{STID\_Valid\_Offset} \quad \text{[Equation 1]}$$

Namely, the M2M device can use an STID in frames indicated by an STID valid offset when performing a modulo operation of a frame number $\text{Frame}_{num}$ by STID_Valid_Periodicity.

As another embodiment of the present invention, the ABS may assign different ACIDs to M2M devices which share the same STID. Namely, the M2M devices using the same STID use different ACIDs from each other. For example, when M2M devices 1, 2, 3, and 4 share an STID 1 based on a frame, the ABS may assign ACIDs 1, 2, 3, and 4 to the M2M device 1, ACIDs 5, 6, 7, and 8 to the M2M device 2, ACIDs 9, 10, 11, and 12 to the M2M device 3, and ACIDs 13, 14, 15, and 16 to the M2M device 4.

Upon assigning an STID to M2M devices, the ABS may assign ACIDs which can be used by the M2M devices. In step S605 for example, the ABS may assign ACIDs together with the STID. The following Table 5 shows an example of the AAI-REG-RSP message which can be used in step S605.

TABLE 5

| Field | Size (bits) | Value/Description | Condition |
|---|---|---|---|
| ... | ... | ... | ... |
| Support of STID sharing | 1 | 0: STID sharing is not supported<br>1: STID sharing is supported | Shall be included when an M2M device is performing initial network entry. |
| STID_Valid_Periodicity | 3 | The STID_Valid_Periodicity together with STID_Valid_Offset indicates at which frames the assigned STID is valid for the M2M device | If STID sharing is supported by M2M device and ABS, this parameter shall be included when an M2M device is performing initial network entry or an M2M device has no STID pre-assigned when it is performing network reentry procedure (see 6.2.15) |
| STID_Valid_Offset | 3 | The STID_Valid_Offset together with STID_Valid_Periodicity indicates at which frames the assigned STID is valid for the M2M device | If STID sharing is supported by M2M device and ABS, this parameter shall be included when an M2M device is performing initial network entry or an M2M device has no STID pre-assigned when it is performing network reentry procedure (see 6.2.15) |
| Num_of_ACID | 4 | Number of ACIDs to be assigned to M2M device | If STID sharing is supported by M2M device and ABS, this parameter shall be included when an M2M device is performing initial network entry or an M2M device has no STID pre-assigned when it is performing network reentry procedure (see 6.2.15) |

Upon receiving the AAI-REG-REQ message, the ABS may transmit, to the M2M device, the AAI-REG-RSP message including a start value of an ACID to be assigned to the M2M device and the number of ACIDs to be assigned. For example, if a start value of an ACID of an M2M device 2 is 5 and if a value of a Num_of_ACID field is 4, then ACIDs 5, 6, 7, and 8 may be assigned to the M2M device 2.

The following Table 6 shows another example of a format of the AAI-REG-RSP message which may be used in step S605.

TABLE 6

| Field | Size (bits) | Value/Description | Condition |
|---|---|---|---|
| ... | ... | ... | ... |
| Support of STID sharing | 1 | 0: STID sharing is not supported<br>1: STID sharing is supported | Shall be included when an M2M device is performing initial network entry. |
| STID_ValidPeriodicity | 3 | The STID_Valid_Periodicity together with STID_Valid_Offset indicates at which frames the assigned STID is valid for the M2M device | If STID sharing is supported by M2M device and ABS, this parameter shall be included when an M2M device is performing initial network entry or an M2M device has no STID pre-assigned when it is performing network reentry procedure (see 6.2.15) |
| STID_V al id_Offset | 3 | The STID_Valid_Offset together with STID_Valid_Periodicity indicates at which frames the assigned STID is valid for the M2M device | If STID sharing is supported by M2M device and ABS, this parameter shall be included when an M2M device is performing initial network entry or an M2M device has no STID pre-assigned when it is performing network reentry procedure (see 6.2.15) |
| For (i=0; i< Num_of_ACID; i++) {<br>ACID | 4 | ACIDs to be assigned to M2M device | If STID sharing is supported by M2M device and ABS, this parameter shall be included when an M2M device is performing initial network entry or an M2M device has no STID pre-assigned when it is performing network reentry procedure (see 6.2.15) |
| } | | | |

In Table 6, ACIDs assigned to the M2M device are applicable to both DL and UL. If different ACIDs are assigned in DL and UL, ACID information (e.g. Start of ACID and Num_of ACID) for each of DL and UL may be included.

Accordingly, upon receiving a DL/UL basic assignment A-MAP IE, the M2M device is able to know whether the received information is resource allocation information corresponding thereto by checking an ACID of the corresponding MAP IE.

4. HARQ Timing Setting Method

Hereinafter, HARQ timing setting methods as embodiments of the present invention will be described in detail.

As described in the above '3. STID sharing method', if the STID is defined so as to be used in a specific frame, it is difficult for the M2M device to apply a HARQ timing setting method defined in a legacy IEEE 802.16m system.

For example, a formula defined in Table 3 is applied to the TDD DL HARQ process shown in FIG. 4. Upon receiving DL assignment and DL data burst in a DL subframe 1 of the i-th frame, the M2M device transmits the HARQ feedback in a UL subframe 0 of the next (i+1)-th UL frame. However, if an STID valid periodicity is 4, the M2M should not transmit the HARQ feedback in the UL frame 0 of the next frame because the next frame is used for another M2M device to which the same STID has been assigned. In UL, a formula defined in Table 4 is applied to the TDD UL HARQ process shown in FIG. 5. Upon receiving DL assignment in a DL subframe 1 of the i-th frame, the M2M device transmits a UL burst in a UL subframe 0 of the same frame (i.e. i-th frame).

At this time, if an error occurs in the UL burst, in the legacy IEEE 802.16m system, the ABS transmits a NACK message to the M2M device in a DL subframe 1 of the next (i+1)-th frame and the M2M device retransmits the UL burst in a UL subframe 0 of the (i+1)-th frame. However, under a circumstance in which M2M devices share an STID on a frame basis, if the STID valid periodicity is 4, the M2M device retransmits the UL burst not in the UL subframe 0 of the (i+1)-th frame but in a UL subframe 0 of a frame of the next period (i.e. (i+4)-th frame (STID_Valid_Periodicity). In this case, the ABS transmits a HARQ NACK in a UL subframe 1 of the next period.

If HARQ timing is not changed as described above, the M2M will attempt retransmission in the same resource region of the next frame upon occurrence of NACK during UL transmission. In addition, the ABS may transmit a UL basic assignment A-MAP IE to the M2M device sharing the same STID at a corresponding time in order to assign a UL resource region. At this time, the M2M device attempting retransmission judges that a resource assignment location for retransmission thereof has been changed because the UL basic assignment A-MAP IE corresponding to the same STID has been received. Accordingly, the M2M device may attempt retransmission through an assigned UL resource. In this case, there may be a problem in that M2M devices sharing the same STID simultaneously use the same resource region.

Therefore, since M2M devices are not capable of applying predefined HARQ timing when a plurality of M2M devices shares one STID on a frame basis, it is necessary to newly define HARQ timing and MAP relevance for the M2M devices sharing the STID on a frame basis.

Figure 7:
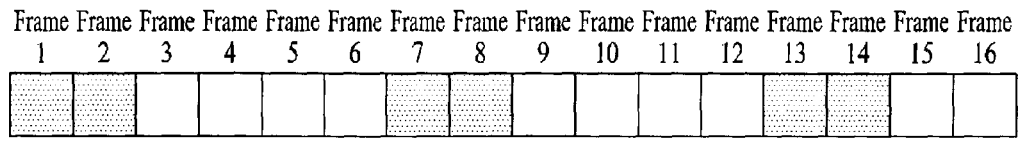
FIG. 7 is a diagram showing HARQ timing and A-MAP relevance used by M2M devices sharing an STID according to an embodiment of the present invention.

FIG. 7 is a diagram showing HARQ timing and A-MAP relevance used by M2M devices sharing an STID according to an embodiment of the present invention.

As described above, if an STID is shared by M2M devices on a frame basis and HARQ timing and A-MAP relevance exceed a frame assigned to the M2M devices within one period, the M2M devices may apply the HARQ timing or A-MAP relevance starting from a frame of a next period which can be used by the M2M devices using an STID valid periodicity field and an STID valid offset field.

For example, if a frame which can be used by M2M devices within the STID valid periodicity is one and if HARQ timing or A-MAP relevance is not applied within the one frame, the HARQ timing and A-MAP relevance may be applied in a frame indicated by the STID valid offset allocated to the M2M devices after the STID valid periodicity.

If the STID valid periodicity is 6 and if there are two frames which can be shared by M2M devices, the M2M devices use the two frames, and if HARQ timing or A-MAP relevance deviates from the two frames assigned to the M2M devices, HARQ timing or A-MAP relevance may be applied to the first frame of the next period.

In FIG. 7, it is assumed that an STID valid offset is 1 and an STID valid duration is 2. Accordingly, an M2M device may use frames 1, 2, 7, 8, 13, and 14. If HARQ timing and A-MAP relevance are extended to frame 3 exceeding frame 2, the M2M device may use frame 7 instead of frame 3. If HARQ timing and A-MAP relevance are extended to frame 9 exceeding frame 8, frame 13 instead of frame 9 may be used for HARQ timing and A-MAP relevance.

The following Table 7 shows TDD DL HARQ timing when the STID valid duration is 1 (i.e. when only one frame indicated by the STID valid offset is used per period).

TABLE 7

| Content | AAI Subframe Index | Frame Index |
|---|---|---|
| DL Assignment A-MAP IE Tx | l | i |
| DL HARQ Subpacket Tx | m = l | i |
| UL HARQ feedback | For D > U $n = \begin{cases} 0, & \text{for } 0 \le m < K \\ m - K, & \text{for } K \le m < U + K \\ U - 1, & \text{for } U + K \le m < D \end{cases}$ where K = floor((D − U)/2) For D ≤ U n = m − K where K = −ceil((U − D)/2) | $j = (i + z) \bmod 4 * \text{STID\_Valid\_Periodicity}$ where $z = \begin{cases} 0, & \text{if } (D - m - N_{TTI} + n \ge T_{DL\_Rx\_Processing}) \\ \text{STID\_Valid\_Periodicity} & \text{else} \end{cases}$ |

Referring to Table 7, D denotes the number of DL subframes defined by a frame configuration table of Table 7 and U denotes the number of UL subframes. l denotes a DL subframe number in which an A-MAP is transmitted, starting from 0 for a first DL subframe and numbering up to D−1. m denotes a DL subframe number in which HARQ subpacket transmission is started, starting from 0 for a first DL subframe 0 and numbering up to D−1. n denotes a UL subframe number in which a HARQ ACK message is transmitted, starting from 0 for a first subframe 0 and numbering up to U−1. i denotes a frame number in which an A-MAP is transmitted and a HARQ subpacket is started, starting from 0 for a first frame of a superframe and numbering up to 3. j denotes a frame number in which a HARQ ACK message is transmitted, starting from 0 for a first frame of a superframe and numbering up to (4*STID valid periodicity−1). $N_{TTI}$ denotes the number of AAI subframes that a HARQ subpacket spans (i.e. 1 for a default TTI to 4 for a long TTI in TDD DL). A data burst Rx processing time required by an M2M device is $T_{DL\_Rx\_Processing}$ and is measured in subframes. Ceil(x) denotes a unit function indicating a minimum integer which is greater than or equal to x, and floor (x) denotes a unit function indicating a maximum integer which is less than or equal to x.

A DL assignment A-MAP IE transmitted in an l-th (excluding 0) DL subframe of an i-th frame also indicates long TTI transmission. In this case, long TTI transmission of a DL HARQ subpacket is started in a 0-th DL subframe of an (i+1)-th frame. A HARQ feedback for long TTI transmission is transmitted in an n-th UL subframe of a j-th frame. The subframe index n and the frame index j are calculated according to equations shown in Table 5 by replacing the subframe index m and the frame index i by 1 and (i+1), respectively.

Referring to Table 7, the time relationship between a DL assignment A-MAP IE corresponding to HARQ feedback, a DL HARQ subpacket with a default TTI, and retransmission in a TDD frame structure for channel bandwidths of 5, 10, and 20 MHz can be checked.

The following Table 8 shows TDD UL HARQ timing when the STID valid duration is 1 (i.e. when only one frame indicated by the STID valid offset is used per period).

TABLE 8

| Content | AAI Subframe Index | Frame Index |
|---|---|---|
| UL Assignment A-MAP Tx IE in DL | l | i |
| HARQ Subpacket Tx in UL | for default TTI and $D \geq U$<br>$m = \begin{cases} 0, & \text{for } 0 \leq l < K \\ l - K, & \text{for } K \leq l < U + K \\ U - 1, & \text{for } U + K \leq l < D \end{cases}$<br>Where<br>$K = \text{floor}((D - U)/2)$<br><br>For default TTI and $- D < U$<br>$m = \begin{cases} 0, \ldots, \text{or } l - K, & \text{for } l = 0 \\ l - K, & \text{for } 0 < l < D - 1 \\ l - K, \ldots, \text{or } U - 1, & \text{for } l = D - 1 \end{cases}$<br>Where<br>$K = -\text{ceil}((U - D)/2)$<br><br>For long TTI<br>$m = 0$ | $j = (i + v)\mod(4*\text{STID\_Valid\_Periodicity})$<br>Where<br>$v = \begin{cases} 0, & \text{if } (D - l - 1 + m \geq T_{UL\_Tx\_Processing}) \\ \text{STID\_Valid\_Periodicity, else} \end{cases}$ |
| HARQ feedback in DL | l | $k = (j + w)\mod(4*\text{STID\_Valid\_Periodicity})$<br>Where<br>$w = \begin{cases} 0, & \text{if } (U - m - N_{TTI} + 1 \geq T_{UL\_Rx\_Processing}) \\ \text{STID\_Valid\_Periodicity, else} \end{cases}$ |
| HARQ Subpacket ReTx in UL | m | $p = (k + v)\mod 4*\text{STID\_Valid\_Periodicity}$<br>Where<br>$v = \begin{cases} 0, & \text{if } (D - l - 1 + m \geq T_{UL\_Tx\_Processing}) \\ \text{STID\_Valid\_Periodicity, else} \end{cases}$ |

In TDD UL HARQ timing, when calculating v in order to obtain a UL HARQ subpacket transmission frame index j, if $(D-l-1+m)<T_{UL-Tx\_Processing}$, then an M2M device uses an STID valid periodicity value instead of 1. In addition, j may be modified to $j=(i+v)\mod 4*\text{STID\_Valid\_Periodicity}$ using the STID valid periodicity value. Then j is determined between 0 and (4*STID_Valid_Periodicity−1).

In TDD UL HARQ timing, when calculating w in order to obtain a DL HARQ feedback transmission frame index k, if $(U-m-N_{TTI}+1)<T_{UL-Rx\_Processing}$, then an M2M device may use an STID valid periodicity instead of 1. In addition, k may be modified to $k=(j+w)\mod(4*\text{STID\_Valid\_Periodicity})$ using the STID valid periodicity. Then, k is determined between 0 and (4*STID_Valid_periodicity−1).

In TDD UL HARQ timing, when calculating v in order to obtain a DL HARQ subpacket retransmission frame index p, if $(D-l-1+m)<T_{UL-Tx\_Processing}$, then an M2M device may use an STID valid periodicity instead of 1. In addition, p may be modified to $p=(k+v)\mod 4*\text{STID\_Valid\_Periodicity}$, using the STID valid periodicity. Therefore, p may be determined between 0 to (4*STID_Valid_Periodicity−1).

Variables disclosed in Table 8 will now be described based on the above reconfigured parameter values. In Table 8, D denotes the number of DL subframes defined by the frame configuration table and U denotes the number of UL subframes. l denotes a DL subframe number in which an A-MAP or a HARQ ACK message is transmitted, starting from 0 for a first DL subframe and numbering up to D−1. m denotes a DL subframe number in which HARQ subpacket transmission is started, starting from 0 for a first DL subframe 0 and numbering up to U−1. i denotes a frame number in which an A-MAP is transmitted, starting from 0 for a first frame of a superframe and numbering up to 3. j denotes a frame number in which HARQ subpackets are transmitted, starting from 0 for a first frame of a superframe and numbering up to (4*STID_Valid_Periodicity−1). p denotes a frame number in which a HARQ ACK is transmitted, starting from 0 for a first frame of a superframe and numbering up to (4*STID_Valid_Periodicity−1). k denotes a frame number in which HARQ subpacket transmission is started, starting from 0 for a first frame of a superframe and numbering up to (4*STID_Valid_Periodicity−1). $N_{TTI}$ denotes the number of AAI subframes that a HARQ subpacket spans (i.e. 1 for a default TTI to 4 for a long TTI in TDD DL. $T_{UL\_Tx\_Processing}$ denotes a data burst Tx processing time required by an M2M device and is measured in subframes. $T_{UL\_Rx\_Processing}$ denotes an Rx processing time required by an ABS and is measured in subframes.

The following Table 9 shows FDD UL HARQ timing when the STID valid duration is 1 (i.e. when only one frame indicated by the STID valid offset is used per period).

TABLE 9

| Content | AAI Subframe Index | Frame Index |
|---|---|---|
| DL Assignment A-MAP IE Tx | l | i |
| DL HARQ Subpacket Tx | m = l | i |

TABLE 9-continued

| Content | AAI Subframe Index | Frame Index |
|---|---|---|
| UL HARQ feedback | n = ceil(m + F/2)modF | j = (i + z) mod(4*STID_Valid_Periodicity) Where $z = \begin{cases} 0, & \text{if}(((\text{ceil}(F/2) - N_{TTI}) \geq T_{DL\_Rx\_Processing}) \\ & \&\& \left(\text{floor}\left(\frac{\text{ceil}(m + F/2)}{F}\right) < 1\right)) \\ \text{STID\_Valid\_Periodicity, else} \end{cases}$ |

To obtain a UL HARQ feedback frame index in FDD DL HARQ timing, $$\text{if}\left(((\text{ceil}(F/2) - N_{TTI}) \geq T_{DL\_Rx\_Processing}) \&\& \left(\text{floor}\left(\frac{\text{ceil}(m + F/2)}{F}\right) < 1\right)\right),$$

then z is set to 0, and otherwise, STID_Valid_Periodicity is used. A frame index j may be determined as j=(i+z) mod (4*STID_Valid_Periodicity) using STID_Valid_Periodicity. Then, j is determined between a frame 0 to (4*STID_Valid_Periodicity−1).

In Table 9, F denotes the number of subframes defined by the frame configuration table. l denotes a DL subframe number in which an A-MAP is transmitted, starting from 0 for a first DL subframe and numbering up to F−1. m denotes a DL subframe number in which HARQ subpacket transmission is started, starting from 0 for a first DL subframe 0 and numbering up to F−1. n denotes a UL subframe number in which a HARQ ACK message is transmitted, starting from 0 for a first subframe 0 and numbering up to F−1. i denotes a frame number in which an A-MAP is transmitted and a HARQ subpacket is started, starting from 0 for a first frame of a superframe and numbering up to 3. j denotes a frame number in which a HARQ ACK message is transmitted, starting from 0 for a first frame of a superframe to (4*STID_Valid_Periodicity−1). $N_{TTI}$ denotes the number of AAI subframes that a HARQ subpacket spans (i.e. 1 for a default TTI to 4 for a long TTI in FDD DL). A data burst Rx processing time required by an M2M device is $T_{DL\_Rx\_Processing}$ and is measured in subframes.

The following Table 10 shows FDD UL HARQ timing when the STID valid duration is 1 (i.e. when only one frame indicated by the STID valid offset is used per period).

TABLE 10

| Content | AAI Subframe Index | Frame Index |
|---|---|---|
| UL Assignment A-MAP Tx IE | l | i |
| UL HARQ Subpacket Tx | m = ceil(l + F/2)modF | j = (i + v)mod(4*STID_Valid_Periodicity) where $v = \begin{cases} 0, & \text{if}(((\text{ceil}(F/2) - 1) \geq T_{UL\_Tx\_Processing}) \\ & \&\& \left(\text{floor}\left(\frac{\text{ceil}(l + F/2)}{F}\right) < 1\right)) \\ \text{STID\_Valid\_Periodicity, else} \end{cases}$ |
| DL HARQ feedback | l | k = (j + w)mod(4*STID_Valid_Periodicity) Where $w = \begin{cases} 0, & \text{if}((\text{floor}(F/2) - N_{TTI}) \geq T_{UL\_Rx\_Processing}) \\ & \&\& \left(\text{floor}\left(\frac{(m + F/2)}{F}\right) < 1\right)) \\ \text{STID\_Valid\_Periodicity, else} \end{cases}$ |
| UL HARQ Subpacket ReTx | m | p = (k + v)mod(4*STID_Valid_Periodicity) Where $v = \begin{cases} 0, & \text{if}(((\text{ceil}(F/2) - 1) \geq T_{UL\_Tx\_Processing}) \\ & \&\& \left(\text{floor}\left(\frac{\text{ceil}(l + F/2)}{F}\right) < 1\right)) \\ \text{STID\_Valid\_Periodicity, else} \end{cases}$ |

When calculating v in order to obtain a UL HARQ subpacket transmission frame index j in FDD UL HARQ timing, $$\text{if}\left(((\text{ceil}(F/2) - 1) \geq T_{UL\_Tx\_Processing}) \&\& \left(\text{floor}\left(\frac{\text{ceil}(l + F/2)}{F}\right) < 1\right)\right),$$

then an M2M device sets v to 0, and otherwise, uses an STID_Valid_Periodicity value. The frame index j may be modified to j=(i+v)mod(4*STID_Valid_Periodicity) using v and STID_Valid_Periodicity. In this case, j is determined between 0 to (4*STID_Valid_Periodicity−1).

When calculating w in order to obtain a DL HARQ feedback frame index k in FDD UL HARQ timing, $$\text{if}\left((\text{floor}(F/2) - N_{TTI} \geq T_{UL\_Rx\_Processing}) \&\& \left(\text{floor}\left(\frac{(m+F/2)}{F}\right) < 1\right)\right),$$

then an M2M device sets w to 0, and otherwise, uses an STID_Valid_Periodicity. The frame index k may be modified to k=(j+w)mod(4*STID_Valid_Periodicity) using w and STID_Valid_Periodicity. In this case, k is determined between 0 to (4*STID_Valid_Periodicity−1).

When calculating v in order to obtain a DL HARQ subpacket retransmission frame index p in FDD UL HARQ timing, $$\text{if}\left(((\text{ceil}(F/2) - 1) \geq T_{UL\_Tx\_Processing}) \&\& \left(\text{floor}\left(\frac{\text{ceil}(l+F/2)}{F}\right) < 1\right)\right),$$

then an M2M device sets v to 0, and otherwise, uses an STID_Valid_Periodicity value. The frame index p may be modified to j=(i+v) mod(4*STID_Valid_Periodicity) using v and STID_Valid_Periodicity. In this case, p is determined between 0 to (4*STID_Valid_Periodicity−1).

Variables disclosed in Table 10 will now be described based on the above reconfigured parameter values. In Table 10, F denotes the number of subframes defined by the frame configuration table, and l denotes a DL subframe number in which an A-MAP or a HARQ ACK message is transmitted, starting from 0 for a first DL subframe and numbering up to F−1. In the case of long TTI transmission, 1 is permitted only within subframes F−4 to 0 (i.e. $1 \in \{F-4, F-3, \ldots, F-1, 0\}$). m denotes a UL subframe number in which HARQ subpacket transmission is started, starting from 0 for a first DL subframe 0 and numbering up to F−1.

i denotes a frame number in which an A-MAP is transmitted, starting from 0 for a first frame of a superframe and numbering up to 3. j denotes a frame number in which HARQ subpackets are transmitted, starting from a first frame 0 of a superframe to (4*STID_Valid_Periodicity−1). p denotes a frame number in which a HARQ ACK message is transmitted, starting from 0 for a first frame of a superframe and numbering up to (4*STID_Valid_Periodicity−1). k denotes a frame number in which HARQ subpacket transmission is started, starting from 0 for a first frame of a superframe and numbering up to (4*STID_Valid_Periodicity−1). $N_{TTI}$ denotes the number of AAI subframes that a HARQ subpacket spans (i.e. 1 for a default TTI to 4 for a long TTI in FDD DL). $T_{UL\_Tx\_Processing}$ denotes a data burst Tx processing time required by an M2M device and is measured in subframes. $T_{DL\_Rx\_Processing}$ denotes an Rx processing time required by an ABS and is measured in subframes.

5. HARQ Operation Supporting Method Using HARQ Channel Identifier

When M2M devices share the STID on a frame basis as shown in FIG. 6, if HARQ timing is not changed as shown in Equation 2, the M2M devices would perform retransmission using the same resource of a next frame.

Figure 8:
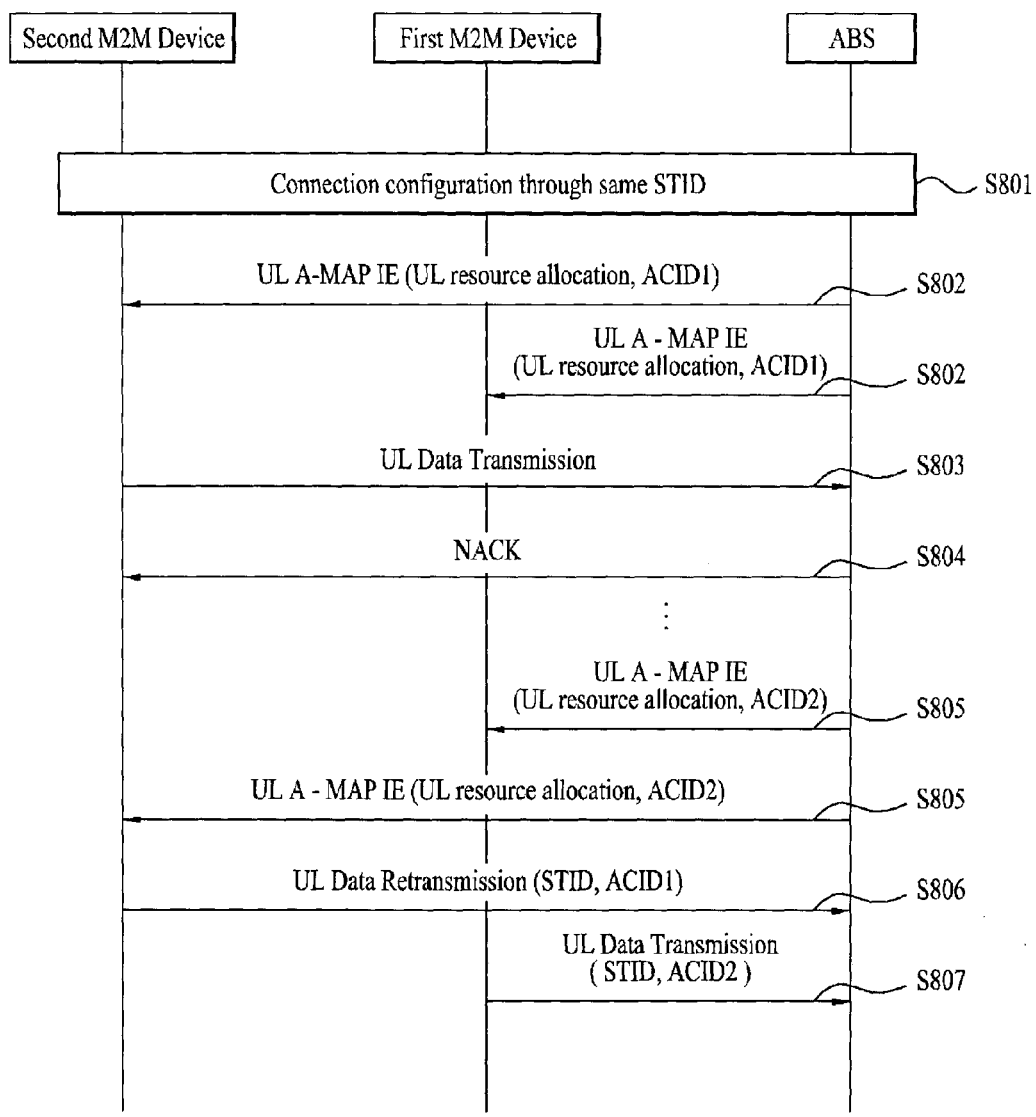
FIG. 8 is a diagram showing a UL HARQ operation supporting method using ACIDs according to an embodiment of the present invention.

If an ABS broadcasts a UL basic assignment A-MAP IE in an area thereof in order to allocate a new UL resource to M2M devices sharing the same STID with other M2M devices at a NACK occurrence time, the M2M devices may determine that a resource assignment location for retransmission has been changed because the M2M devices which are attempted retransmission receive the UL basic assignment A-MAP IE including the same STID. Accordingly, the M2M devices may attempt retransmission using a newly assigned UL resource. In this case, since other M2M devices share the same STID, they may receive the broadcast UL basic assignment A-MAP IE. Accordingly, collision may occur between the M2M devices performing retransmission and the M2M devices starting new transmission by simultaneously using the same UL resource region. In FIG. 8, a method for solving such a problem is proposed.

(1) First Method

When retransmission occurs in M2M devices sharing an STID, an ABS may not assign a new resource region to the M2M devices using the same STID at a retransmission occurrence time (i.e. in a subframe in which retransmission is performed).

(2) Second Method

When UL retransmission occurs in M2M devices sharing the same STID, an ABS does not use the same ACID as an ACID of the M2M device (or UL burst) performing retransmission to assign a new resource region to the other M2M devices sharing the same STID at a retransmission occurrence time (i.e. in a subframe in which retransmission is performed). That is, when an ABS allocates new UL resource to an M2M device sharing a STID, if there if UL burst retransmitted by other M2M devices sharing the same STID at the same UL subframe, the ABS shall allocate the new UL resource by using different ACID from the ACID of retransmitted UL burst. Namely, when a resource in which retransmission is performed and a resource in which new transmission is performed use the same STID, the two resources should use different ACIDs. Hereinafter, the second method will be described in detail.

FIG. 8 is a diagram showing a UL HARQ operation supporting method using ACIDs according to an embodiment of the present invention.

Referring to FIG. 8, it is assumed that a connection of a first M2M device and a second M2M device is configured through the same STID. In other words, the first M2M device and the second M2M device share the same STID (step S801).

An ABS may transmit a UL A-MAP IE to the first and second M2M devices in an i-th frame to allocate UL resources. At this time, the UL A-MAP IE may include resource allocation information indicating a resource region assigned to the M2M devices, an STID assigned to the M2M devices, and a first ACID (ACID 1) which is a HARQ channel identifier used during retransmission (step S802).

If UL data to be transmitted by the second M2M device is generated, the second M2M device transmits the UL data to the ABS through the resource region indicated by the resource allocation information (step S803).

If an error occurs in the UL data transmitted by the second M2M device, the ABS transmits a NACK message to the second M2M device in the i-th frame (step S804).

In some cases, the ABS needs to allocate a new UL resource region to M2M devices other than the second M2M device in a subframe in which the second M2M device performs retransmission. At this time, the ABS has transmitted the NACK message to the second M2M device and has negotiated with the M2M devices about a HARQ processing operation (not shown), the ABS has already known all HARQ scheduling information of each M2M device.

Accordingly, if a UL burst retransmitted from the second M2M device which shares the STID with the first M2M device is present in a subframe to which a UL resource is assigned, the ABS may allocate the new UL resource using a second ACID (ACID2) which is different from the first ACID of the UL burst to be retransmitted. Then the ABS transmits a UL A-MAP IE to the M2M devices in an (i+1)-th frame or (i+n)-th frame (where n=2 or 3), the UL A-MAP IE including the shared STID, new resource assignment information, and the second ACID different from the first ACID (step S805).

Since the second M2M device shares the STID, the second M2M device may receive the UL A-MAP IE in step S805. The second M2M device may also identify the second ACID included in the UL A-MAP IE. In this case, if the newly transmitted second ACID is different from the first ACID for the UL data to be retransmitted, the second M2M device may recognize that the resource region allocated in step S805 is not a resource region to be used for retransmission. Namely, the M2M devices which share the same STID may determine whether the resource region is allocated thereto by identifying an ACID.

Since the first ACID assigned in step S802 is different from the second ACID assigned in step S805, the second M2M device is able to recognize that the resource region assigned, in step S805 is not a resource region reassigned for retransmission. Accordingly, the second M2M device may retransmit UL data to the ABS using the STID and the first ACID not through the resource region assigned in step S805 but through the region assigned in step S802 (step S806).

In addition, the first M2M device may transmit new UL data using the STID and the second ACID through the resource region newly assigned in step S805 in a subframe in which retransmission is performed (step S807).

The embodiment described with reference to FIG. 8 will now be explained again in association with frame numbers. The first and second M2M devices receive a first STID (STID1) through an AAI-REG-RSP message allocated during a network entry process and have STID_Offset of 1 and 2, respectively, and STID_Periodicity is set to 4 (refer to FIG. 6). The first and second M2M devices will use the STID1 in frame 1 and frame 2, respectively.

The ABS will transmit a UL basic assignment A-MAP IE to allocate a UL resource using the STID1 and an ACID1 to the first M2M device, and the first M2M device transmits a UL packet using the assigned resource. Here, if an error occurs in the UL packet, the ABS transmits a NACK to the first M2M device in the next frame through a DL HARQ channel. At this time, the ABS transmits a UL basic assignment A-MAP IE using ACID=2 to the second M2M device in order to allocate a UL resource. Upon receiving the UL basic assignment A-MAP IE in which the ACID is set to 2, the first M2M device determines that the corresponding A-MAP IE is not assigned thereto and disregards the A-MAP IE. In addition, the second M2M device transmits a UL packet through a resource indicated by the UL basic assignment A-MAP IE in which the ACID is set to 2. In this way, the possibility of collision between M2M devices using the same STID can be reduced by differentiating resource regions assigned during initial transmission and retransmission to the M2M devices using different ACIDs.

The present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents and all changes coming within the meaning and equivalency range of the appended claims are intended to be embraced therein. Claims which are not explicitly dependent on each other may be combined to provide the embodiments or new claims may be added through amendment after this application is filed.

[Industrial Applicability]

The embodiments of the present invention may be applied to a variety of wireless access systems. Examples of the wireless access systems include a 3rd Generation Partnership Project (3GPP) system, a 3GPP2 system, and/or an Institute of Electrical and Electronic Engineers (IEEE) 802 system. The embodiments of the present invention may be applied not only to the various wireless access systems but also to all technical fields to which the various wireless access systems are applicable.

The invention claimed is:

1. A method for supporting a Hybrid Automatic Repeat Request (HARQ) operation of Machine-to-Machine (M2M) devices using a HARQ Channel Identifier (ACID) in a wireless access system, the method comprising:

transmitting, at a base station, a first uplink (UL) A-MAP Information Element (IE) including first resource allocation information and a first ACID to M2M devices sharing a Station Identifier (STID);

transmitting, at the base station, a second uplink (UL) A-MAP Information Element (IE) to the M2M devices sharing the STID in a subframe in which a second M2M device is to retransmit a UL burst, the second UL A-MAP IE including a second ACID and second resource allocation information for allocating a resource region to a first M2M device;

receiving the UL burst retransmitted using the first ACID from the second M2M device in the subframe; and receiving a new UL burst transmitted using the second ACID and the second resource allocation information from the first M2M device in the subframe, wherein the first and second M2M devices share the STID, and the first and second ACIDs are different from each other.

2. The method according to claim 1, further comprising:

receiving a UL burst from the second M2M device through a region indicated by the first resource allocation information; and if an error occurs in the received UL burst, transmitting a Negative Acknowledgement (NACK) message to the second M2M device.

3. The method according to claim 1, wherein the first and second UL A-MAP IEs are transmitted using the STID shared by the M2M devices.

4. A method for supporting a Hybrid Automatic Repeat Request (HARQ) operation of Machine-to-Machine (M2M) devices using a HARQ Channel Identifier (ACID) in a wireless access system, the method comprising:

receiving an uplink (UL) A-MAP Information Element (IE) indicating a resource region allocated using a first ACID from a base station;

receiving, at an M2M device, a UL A-MAP IE from the base station in a subframe in which a UL burst is to be retransmitted, the UL A-MAP IE including a second ACID and second resource allocation information indicating an allocated resource region; and retransmitting, at the M2M device, the UL burst using the first ACID in the subframe, if the second ACID is different from the first ACID of the UL burst to be retransmitted, wherein the M2M device shares a Station Identifier (STID) with other M2M devices.

5. The method according to claim 4, wherein the UL A-MAP IE is transmitted using the STID by M2M devices sharing the STID.

6. The method according to claim 4, further comprising:

transmitting a UL burst through the resource region allocated using the first ACID; and receiving a Negative Acknowledgement (NACK) message indicating that an error occurs in the UL burst.

7. A base station for supporting a Hybrid Automatic Repeat Request (HARQ) operation of Machine-to-Machine (M2M) devices using a HARQ Channel Identifier (ACID) in a wireless access system, the base station comprising:
   a transmitter;
   a receiver; and
   a processor for supporting the HARQ operation,
   wherein the base station is configured to:
   transmit a first uplink (UL) A-MAP Information Element (IE) including first resource allocation information and a first ACID to M2M devices sharing a Station Identifier (STID);
   transmit a second UL A-MAP IE to the M2M devices sharing the STID through the transmitter in a subframe in which a second M2M device is to retransmit a UL burst, the second UL A-MAP IE including a second ACID and resource allocation information for allocating a resource region to a first M2M device:
   receive the UL burst retransmitted using the first ACID from the second M2M device in the subframe through the receiver; and
   receive a new UL burst transmitted using the second ACID from the first M2M device in the subframe,
   wherein the first and second M2M devices share the STID, and the first and second ACIDs are different from each other.

8. The base station according to claim 7, wherein the base station is further configured to:
   receive a UL burst from the second M2M device through a region indicated by the first resource allocation information; and
   if an error occurs in the received UL burst, transmit a Negative Acknowledgement (NACK) message to the second M2M device.

9. The base station according to claim 7, wherein the first and second UL A-MAP IEs are transmitted using the STID shared by the M2M devices.

10. A Machine-to-Machine (M2M) device for supporting a Hybrid Automatic Repeat Request (HARQ) operation using a HARQ Channel Identifier (ACID) in a wireless access system, the M2M device comprising:
    a transmitter;
    a receiver; and
    a processor for supporting the HARQ operation,
    wherein the M2M device is configured to:
    receive an uplink (UL) A-MAP Information Element (IE) indicating a resource region allocated using a first ACID from a base station through the receiver;
    receive a UL A-MAP IE from the base station through the receiver in a subframe in which a UL burst is to be retransmitted, the UL A-MAP IE including a second ACID and resource allocation information indicating an allocated resource region; and
    retransmit the UL burst using the first ACID in the subframe through the transmitter, if the second ACID is different from the first ACID of the UL burst to be retransmitted,
    wherein the M2M device shares a Station Identifier (STID) with other M2M devices.

11. The M2M device according to claim 10, wherein the UL A-MAP IE is transmitted using the STID by M2M devices sharing the STID.

12. The M2M device according to claim 11, wherein the M2M device is further configured to:
    transmit a UL burst through the resource region allocated using the first ACID through the transmitter; and
    receive a Negative Acknowledgement (NACK) message indicating that an error occurs in the UL burst through the receiver.

13. A method for supporting a Hybrid Automatic Repeat Request (HARQ) operation of Machine-to-Machine (M2M) devices using a HARQ Channel Identifier (ACID) in a wireless access system, the method comprising:
    allocating, at a base station, a UL resource to a first M2M device which shares a Station Identifier (STID) with a second M2M device; and
    if a UL burst to be retransmitted from the second M2M device sharing the STID with the first M2M device in a subframe in which the UL resource is assigned, allocating, at the base station, the UL resource using an ACID that is different from an ACID of the UL burst to be retransmitted.

14. The method according to claim 13, further comprising transmitting a UL A-MAP IE including resource allocation information indicating the assigned UL resource, the ACID which is different from the ACID of the UL burst, and the STID.

* * * * *